United States Patent
Kawamoto (10) Patent No.: US 9,556,952 B2
(45) Date of Patent: Jan. 31, 2017

(54) VEHICLE CONTROL DEVICE AND VEHICLE CONTROL METHOD

(71) Applicant: JATCO LTD, Fuji-shi, Shizuoka (JP)

(72) Inventor: Yoshinobu Kawamoto, Atsugi (JP)

(73) Assignee: JATCO LTD, Fuji-shi (JP)

( * ) Notice: Subject to any disclaimer, the term of this patent is extended or adjusted under 35 U.S.C. 154(b) by 0 days.

(21) Appl. No.: 14/774,830

(22) PCT Filed: Mar. 3, 2014

(86) PCT No.: PCT/JP2014/055279
§ 371 (c)(1),
(2) Date: Sep. 11, 2015

(87) PCT Pub. No.: WO2014/141916
PCT Pub. Date: Sep. 18, 2014

(65) Prior Publication Data
US 2016/0025212 A1    Jan. 28, 2016

(30) Foreign Application Priority Data
Mar. 12, 2013 (JP) ................. 2013-049405

(51) Int. Cl.
*F02D 45/00* (2006.01)
*F16H 61/00* (2006.01)
(Continued)

(52) U.S. Cl.
CPC ...... *F16H 61/0031* (2013.01); *F16H 61/0025* (2013.01); *F16H 63/50* (2013.01); *B60Y 2300/18016* (2013.01); *F16H 59/72* (2013.01)

(58) Field of Classification Search
CPC .............. F02D 41/042; F02D 45/00; B60Y 2300/18016; Y02T 10/48; Y02T 10/642; F16H 59/22; F16H 59/72; F16H 59/79; F16H 61/00; F16H 61/0025; F16H 61/0031; F16H 61/02; F16H 63/50
(Continued)

(56) References Cited

U.S. PATENT DOCUMENTS 7,748,353 B2 * 7/2010 Russell ............. B60K 6/12
                                                    123/90.12
8,403,646 B2 * 3/2013 Yoshinami ........... F04C 2/102
                                                       417/2
(Continued)

FOREIGN PATENT DOCUMENTS

JP    2006-015724 A    1/2006
JP    2009-098720 A    5/2009
(Continued)

*Primary Examiner* — John Kwon
*Assistant Examiner* — Johnny H Hoang
(74) *Attorney, Agent, or Firm* — Foley & Lardner LLP (57) ABSTRACT

A vehicle control device for controlling a vehicle with a drive source automatic stop unit for automatically stopping a drive source when a predetermined automatic stop condition is satisfied and an electrical oil pump to be driven during an automatic stop of the drive source includes a drive prohibition time calculation unit configured to calculate a drive prohibition time of the electrical oil pump on the basis of a heat generation amount of the electrical oil pump, and a drive prohibition unit configured to prohibit the drive of the electrical oil pump until the drive prohibition time elapses from the end of the drive of the electrical oil pump.

13 Claims, 7 Drawing Sheets

(51) Int. Cl.
*F16H 63/50* (2006.01)
*F16H 59/72* (2006.01)

(58) Field of Classification Search
USPC ............ 701/102, 105–107, 112, 114, 115;
123/179.4, 179.17, 198 D, 357, 495–499
See application file for complete search history.

(56) References Cited

U.S. PATENT DOCUMENTS

| | | | |
|---|---|---|---|
| 2003/0109970 A1* | 6/2003 | Nakamori | B60K 6/365 701/22 |
| 2005/0225279 A1 | 10/2005 | Hatada | |
| 2011/0077828 A1* | 3/2011 | Matsuda | F02D 17/00 701/54 |
| 2012/0035817 A1* | 2/2012 | Waku | B60W 10/06 701/54 |
| 2012/0059571 A1 | 3/2012 | Yamada et al. | |
| 2013/0151129 A1* | 6/2013 | Tatewaki | F02D 45/00 701/112 |

FOREIGN PATENT DOCUMENTS

| | | |
|---|---|---|
| JP | 2012-052640 A | 3/2012 |
| JP | 2012-184703 A | 9/2012 |

\* cited by examiner

VEHICLE CONTROL DEVICE AND VEHICLE CONTROL METHOD

TECHNICAL FIELD

The present invention relates to a vehicle control device and a vehicle control method.

BACKGROUND ART

Conventionally, a vehicle in which an engine automatically stops when a stop condition is satisfied and an electrical oil pump is driven to supply a necessary hydraulic pressure by the electrical oil pump while the engine is automatically stopped is disclosed in JP2012-52640A.

The electrical oil pump stops when the stop condition is no longer satisfied and the engine restarts. The driven electrical oil pump has a high temperature due to heat generation during driving and needs to be cooled. Thus, after the engine restarts and the electrical oil pump stops, the drive of the electrical oil pump is prohibited for a predetermined time.

SUMMARY OF INVENTION

In a scene where the stop condition is temporarily not satisfied in a state where the engine stops automatically and the electrical oil pump is driven and is, immediately thereafter, satisfied, it is required that the engine restarts and the electrical oil pump stops since the stop condition is not satisfied and, thereafter, the engine automatically stops and the electrical oil pump is driven since the stop condition is satisfied again.

In the above technology, the predetermined time during which the drive of the electrical oil pump is prohibited after the stop condition is not satisfied and the electrical oil pump stops is set at a fixed value. Thus, even if a driving time of the electrical oil pump is short and the cooling of the electrical oil pump is ended in a short time, the drive of the electrical oil pump is prohibited for the predetermined time. Because of this, in the above scene, the electrical oil pump cannot be driven and the engine cannot be automatically stopped in response to a request to drive the electrical oil pump again. As just described, despite a state where the electrical oil pump is sufficiently cooled and there is no problem even if the electrical oil pump is driven, the drive of the electrical oil pump is prohibited and the engine does not automatically stop even if the stop condition is satisfied. Thus, in the above technology, there are cases where the engine cannot be automatically stopped and the fuel economy of the engine cannot be improved although the stop condition is satisfied and the fuel economy of the engine can be improved by automatically stopping the engine.

On the other hand, it is also considered to automatically stop the engine and drive the electrical oil pump when the stop condition is satisfied without setting the predetermined time during which the drive of the electrical oil pump is prohibited after the electrical oil pump is stopped.

However, if the stop condition is satisfied and the engine is automatically stopped and the electrical oil pump is driven with priority given to the fuel economy of the engine in a state where the electrical oil pump is not sufficiently cooled and has a high temperature, the temperature of the electrical oil pump further rises. Thus, constituent components of the electrical oil pump may be degraded and the discharge performance and durability of the electrical oil pump may be deteriorated.

The present invention was developed to solve such problems and aims to improve the fuel economy of an engine and suppress deterioration in the discharge performance and durability of an electrical oil pump.

A vehicle control device according to an aspect of the present invention is a vehicle control device for controlling a vehicle with a drive source automatic stop unit configured to automatically stop a drive source when a predetermined automatic stop condition is satisfied and an electrical oil pump to be driven during an automatic stop of the drive source; comprising: a drive prohibition time calculation unit configured to calculate a drive prohibition time of the electrical oil pump on the basis of a heat generation amount of the electrical oil pump; and a drive prohibition unit configured to prohibit the drive of the electrical oil pump until the drive prohibition time elapses from the end of the drive of the electrical oil pump.

A vehicle control method according to another aspect of the present invention is a vehicle control method for automatically stopping a drive source when a predetermined automatic stop condition is satisfied and driving an electrical oil pump during an automatic stop of the drive source, comprising: calculating a drive prohibition time of the electrical oil pump on the basis of a heat generation amount of the electrical oil pump; and prohibiting the drive of the electrical oil pump until the drive prohibition time elapses from the end of the drive of the electrical oil pump.

According to these aspects, the drive prohibition time of the electrical oil pump is calculated on the basis of the heat generation amount of the electrical oil pump and the drive of the electrical oil pump is prohibited on the basis of the drive prohibition time. Thereby, the drive prohibition time of the electrical oil pump can be appropriately set in response to a state of the electrical oil pump. Therefore, when the automatic stop condition is satisfied, the automatically stopping of an engine is started early and the fuel economy of the engine can be improved. Further, these aspects can prevent the electrical oil pump form becoming overheat state, and suppress deterioration in the discharge performance and durability of the electrical oil pump.

DESCRIPTION OF EMBODIMENT

Hereinafter, an embodiment of the present invention is described with reference to the accompanying drawings. It should be noted that, in the following description, a "speed ratio" of a certain transmission mechanism is a value obtained by dividing an input rotation speed of this transmission mechanism by an output rotation speed thereof.

Figure 1:
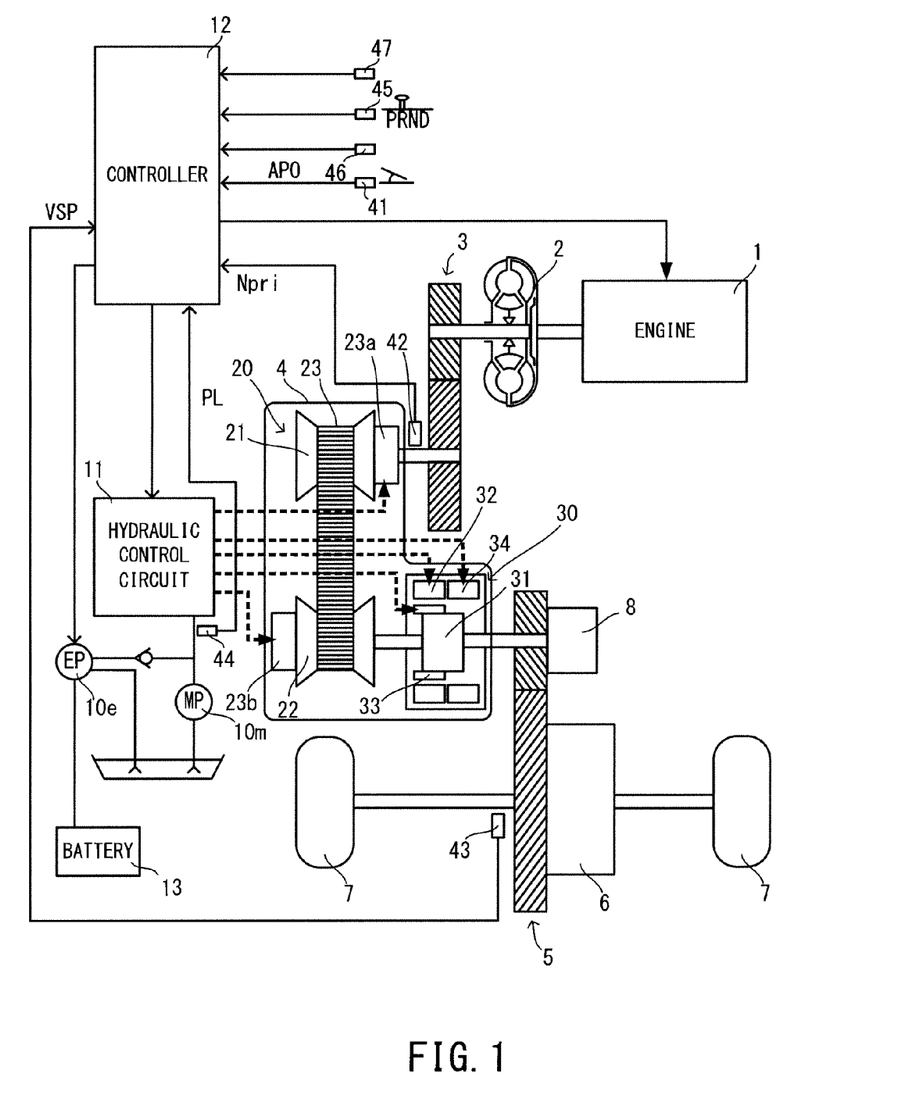
FIG. 1 is a schematic configuration diagram of a vehicle in an embodiment.

FIG. 1 is a schematic configuration diagram of an engine automatic stop vehicle according to the present embodiment. This vehicle includes an engine 1 as a drive source. Output rotation of the engine 1 is transmitted to drive wheels 7 via a torque converter 2 with a lock-up clutch, a first gear train 3, a transmission 4, a second gear train 5 and a differential device 6. The second gear train 5 includes a parking mechanism 8 for mechanically and unrotatably locking an output shaft of the transmission 4 during parking.

The transmission 4 is provided with a mechanical oil pump 10m to which the rotation of the engine 1 is input and which is driven utilizing a part of power of the engine 1, and an electrical oil pump 10e which is driven upon receiving the supply of power from a battery 13. The electrical oil pump 10e is composed of an oil pump main body and an electric motor and a motor driver for rotationally driving the oil pump main body and can control an operation load to an arbitrary load or in a multi-step manner. Further, the transmission 4 is provided with a hydraulic control circuit 11 which adjusts a hydraulic pressure from the mechanical oil pump 10m or the electrical oil pump 10e (hereinafter, referred to as a "line pressure PL") and supplies the adjusted hydraulic pressure to each part of the transmission 4.

The transmission 4 includes a V-belt continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected to the preceding stage (input shaft side) of the variator 20.

The variator 20 includes a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23a, 23b provided on the back surface of this movable conical plate for displacing the movable conical plate in an axial direction. When hydraulic pressures supplied to the hydraulic cylinders 23a, 23b are adjusted, the widths of the V-grooves change to change a contact radius of the V-belt 23 and each pulley 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. By adjusting hydraulic pressures supplied to the frictional engagement elements 32 to 34 to change engaged/released states of the frictional engagement elements 32 to 34, a gear position of the sub-transmission mechanism 30 is changed.

Figure 2:
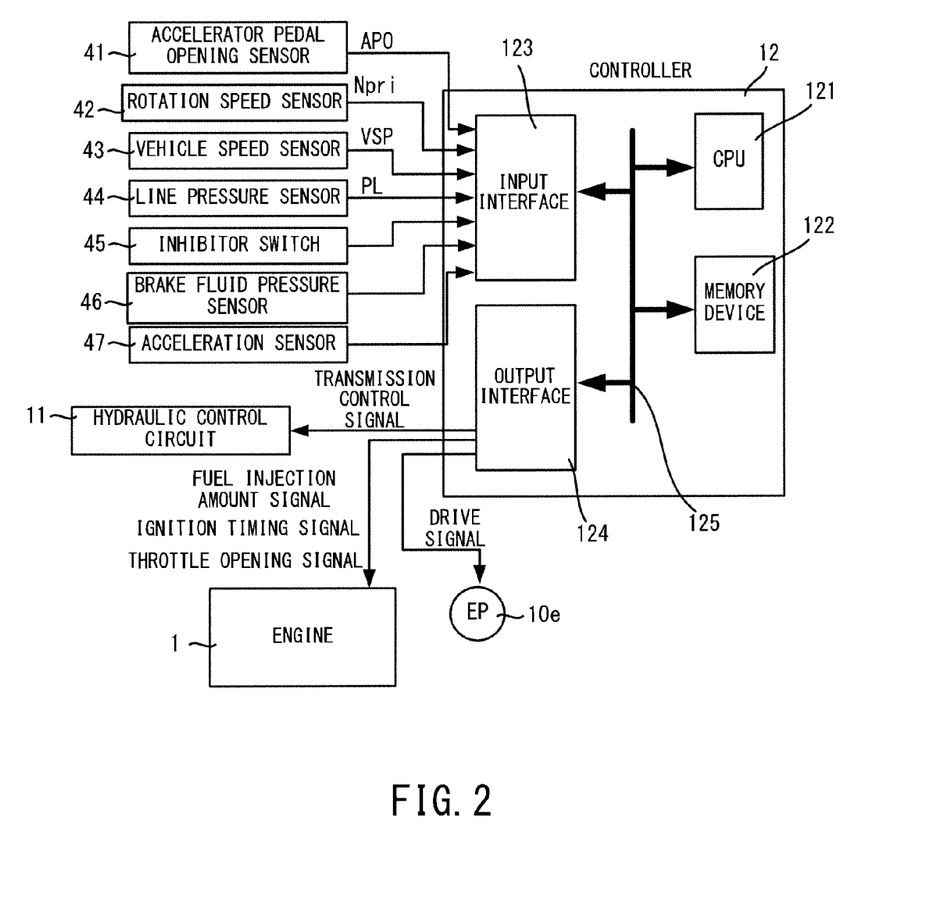
FIG. 2 is a schematic configuration diagram of a controller of the embodiment.

A controller 12 is a controller for integrally controlling the engine 1 and the transmission 4 and, as shown in FIG. 2, configured by a CPU 121, a memory device 122 composed of a RAM and a ROM, an input interface 123, an output interface 124 and a bus 125 which connects these components to each other.

To the input interface 123 are input an output signal of an accelerator pedal opening sensor 41 for detecting an accelerator pedal opening APO indicating an operated amount of an accelerator pedal, an output signal of a rotation speed sensor 42 for detecting an input rotation speed of the transmission 4, an output signal of a vehicle speed sensor 43 for detecting a vehicle speed VSP, an output signal of a line pressure sensor 44 for detecting the line pressure PL, an output signal of an inhibitor switch 45 for detecting the position of a select lever, an output signal of a brake fluid pressure sensor 46 for detecting a brake fluid pressure, an output signal of an acceleration sensor 47 for detecting an acceleration of the vehicle and the like.

A control program of the engine 1, a transmission control program of the transmission 4, and various maps and tables used in these programs are stored in the memory device 122. The CPU 121 reads and executes the programs stored in the memory device 122, performs various computations on various signals input via the input interface 123 to generate a fuel injection amount signal, an ignition timing signal, a throttle opening signal, a transmission control signal and a drive signal for the electrical oil pump 10e, and outputs the generated signals to the engine 1, the hydraulic control circuit 11 and the motor driver of the electrical oil pump 10e via the output interface 124. Various values used in the computations by the CPU 121 and computation results thereof are appropriately stored in the memory device 122.

The hydraulic control circuit 11 is composed of a plurality of flow passages and a plurality of hydraulic control valves. In accordance with a transmission control signal from the controller 12, the hydraulic control circuit 11 controls the plurality of hydraulic control valves to switch supply paths of the hydraulic pressure, prepares a necessary hydraulic pressure from a hydraulic pressure produced by the mechanical oil pump 10m or the electrical oil pump 10e and supplies this to each part of the transmission 4. In this way, the speed ratio of the variator 20 and the gear position of the sub-transmission mechanism 30 are changed and the transmission 4 shifts.

Here, the mechanical oil pump 10m and the electrical oil pump 10e are described.

Since the mechanical oil pump 10m is driven utilizing a part of the power of the engine 1, the hydraulic pressure cannot be supplied to the hydraulic control circuit 11 while the engine 1 is stopped. Accordingly, in order to ensure the hydraulic pressure during an engine stop, the electrical oil pump 10e is driven while the engine 1 is stopped.

It should be noted that "while the engine 1 is stopped" mentioned here does not include a case where the vehicle is in a parked state (key-off) and means a state where the vehicle is driven (key-on state after an engine start) (including vehicle speed=0) and the engine 1 is stopped. Further, "the engine 1 is stopped" does not necessarily require the complete stop of the rotation of the engine 1 and includes such very low-speed rotation that a necessary hydraulic pressure cannot be ensured only by the mechanical oil pump 10m.

Specifically, the electrical oil pump 10e operates when the engine 1 is stopped by an idle stop control or a coast stop control. The idle stop control and the coast stop control are described below.

The idle stop control is a control for suppressing a fuel consumption amount by automatically stopping the engine 1 during a stop.

In executing the idle stop control, the controller 12 determines, for example, the following conditions a1 to a6.

a1: Vehicle is stopped (VSP=0).

a2: Brake pedal is depressed (brake fluid pressure is not lower than a predetermined value).

a3: Accelerator pedal is released (acceleration pedal opening APO=0).

a4: Water temperature of the engine 1 is within a predetermined range Xe.

a5: Oil temperature of the transmission 4 is within a predetermined range Xt.

a6: Inclination of the vehicle (≈road surface gradient) is not larger than a predetermined value.

The controller 12 determines that an idle stop condition is satisfied, permits the idle stop control and stops the engine 1 by cutting fuel injection when all of these conditions a1 to a6 are satisfied.

A lower limit value of the predetermined range Xe of the water temperature of the engine 1 is set at a temperature at which the warm-up of the engine 1 is determined to be completed and an upper limit value thereof is set at a lower limit of a high temperature range in which after-idling of the engine 1 is necessary.

Further, a time required until the frictional engagement element becomes capable of transmitting power after the restart of the engine 1 is shortened by engaging the frictional engagement element of the transmission 4 or causing a piston to stroke by the hydraulic pressure generated by the electrical oil pump 10e during the idle stop control. Thus, the predetermined range Xt of the oil temperature of the transmission 4 is set at a temperature range, in which the electrical oil pump 10e can normally rotate, in consideration of the viscosity of hydraulic oil.

Further, the controller 12 determines whether or not each of the above conditions a1 to a6 continues to be satisfied also during the idle stop control and determines that the idle stop condition is not satisfied, ends the idle stop control and restarts the engine 1 if even one of the above conditions is no longer satisfied.

On the other hand, the coast stop control is a control for automatically stopping the engine 1 when the vehicle is in a coast state and, for example, the lock-up clutch is released.

Since fuel injection is cut and the lock-up clutch is released during the coast stop control, the rotation speed of the engine 1 is very low, wherefore the rotation speed of the mechanical oil pump 10m is also very low and a necessary hydraulic pressure cannot be ensured. Accordingly, to ensure the necessary hydraulic pressure, the electrical oil pump 10e is driven during the coast stop control.

To determine a coast stop state, the controller 12 determines, for example, the following conditions b1 to b4.

b1: Vehicle is running (VSP≠0).

b2: Vehicle speed is not higher than a predetermined vehicle speed VSP 1 (VSP≤VSP1).

b3: Accelerator pedal is released (accelerator pedal opening APO=0).

b4: Brake pedal is depressed (brake fluid pressure is not lower than a predetermined value).

It should be noted that the predetermined vehicle speed VSP 1 is set at a value not larger than a vehicle speed at which the lock-up clutch is released in the coast state and larger than zero.

The controller 12 determines that a coast stop condition is satisfied, permits the coast stop control and cuts fuel injection when all of these conditions b1 to b4 are satisfied.

Further, the controller 12 determines whether or not each of the above conditions b1 to b4 continues to be satisfied also during the coast stop control and determines that the coast stop condition is not satisfied, ends the coast stop control and restarts the engine 1 if even one of the above conditions is no longer satisfied. It should be noted that conditions for ending the coast stop control are not limited to the above conditions b1 to b4.

The idle stop control and the coast stop control are executed as described above. When either one of them is executed, it is determined that the engine 1 is in a stopped state and the electrical oil pump 10e is driven. It should be noted that, as is clear from the above conditions, a transition is directly made to the idle stop control if the vehicle stops in the state where the coast stop control is in execution. In this case, the transition is made from the coast stop control to the idle stop control with the engine 1 stopped, i.e. with the electrical oil pump 10e kept in the driven state.

Here, the prevention of the overheating of the electrical oil pump 10e is described.

The electrical oil pump 10e is composed of the oil pump main body and the electric motor and the motor driver for rotationally driving the oil pump main body as described above. The electric motor generates heat when being driven, and the motor driver generates heat when the electrical oil pump 10e is switched from an OFF-state to an ON-state. When the temperature of the electrical oil pump 10e increases due to heat generation and the electrical oil pump 10e is overheated, it may damage constituent components and cause a reduction in life. Thus, the overheating of the electrical oil pump 10e needs to be prevented. Therefore, the electrical oil pump 10e is controlled to be prohibited from being driven again for a drive prohibition time after a stop and prohibited from being turned on again until the drive prohibition time elapses.

Accordingly, if the idle stop condition and the coast stop condition are not temporarily satisfied and are, immediately thereafter, satisfied again, the drive prohibition time has not elapsed yet. Thus, it is prohibited to drive the electrical oil pump 10e again, with the result that the engine 1 cannot be stopped.

Conventionally, the drive prohibition time has been set at a certain fixed time within which the electrical oil pump 10e can be sufficiently cooled. Thus, if the driving time of the electrical oil pump 10e is short and a heat generation amount of the electrical oil pump 10e is small, the coast stop control has been prohibited until the drive prohibition time set at the certain fixed time elapses although the drive prohibition time necessary to cool the electrical oil pump 10e is short. Thus, the engine 1 does not automatically stop until the drive prohibition time set at the certain fixed time elapses although the electrical oil pump 10e is sufficiently cooled and the fuel economy of the engine 1 can be improved by automatically stopping the engine 1 even without waiting for the elapse of the drive prohibition time set at the certain fixed time after the stop of the electrical oil pump 10e. Therefore, there has been room for improving the fuel economy of the engine 1.

In the present embodiment, the drive prohibition time is calculated on the basis of the heat generation amount of the electrical oil pump 10e and the fuel economy of the engine 1 is improved while the electrical oil pump 10e is prevented from becoming overheated. It should be noted that the heat generation amount of the electrical oil pump 10e is the amount of heat generated by driving the electrical oil pump 10e this time. For example, if the electrical oil pump 10e is stopped and, thereafter, driven, the heat generation amount based on the second drive is only the amount of heat generated by the second drive and not an addition to the heat generation amount by the first drive (heat generation amount by the past drive is not included).

Figure 3:
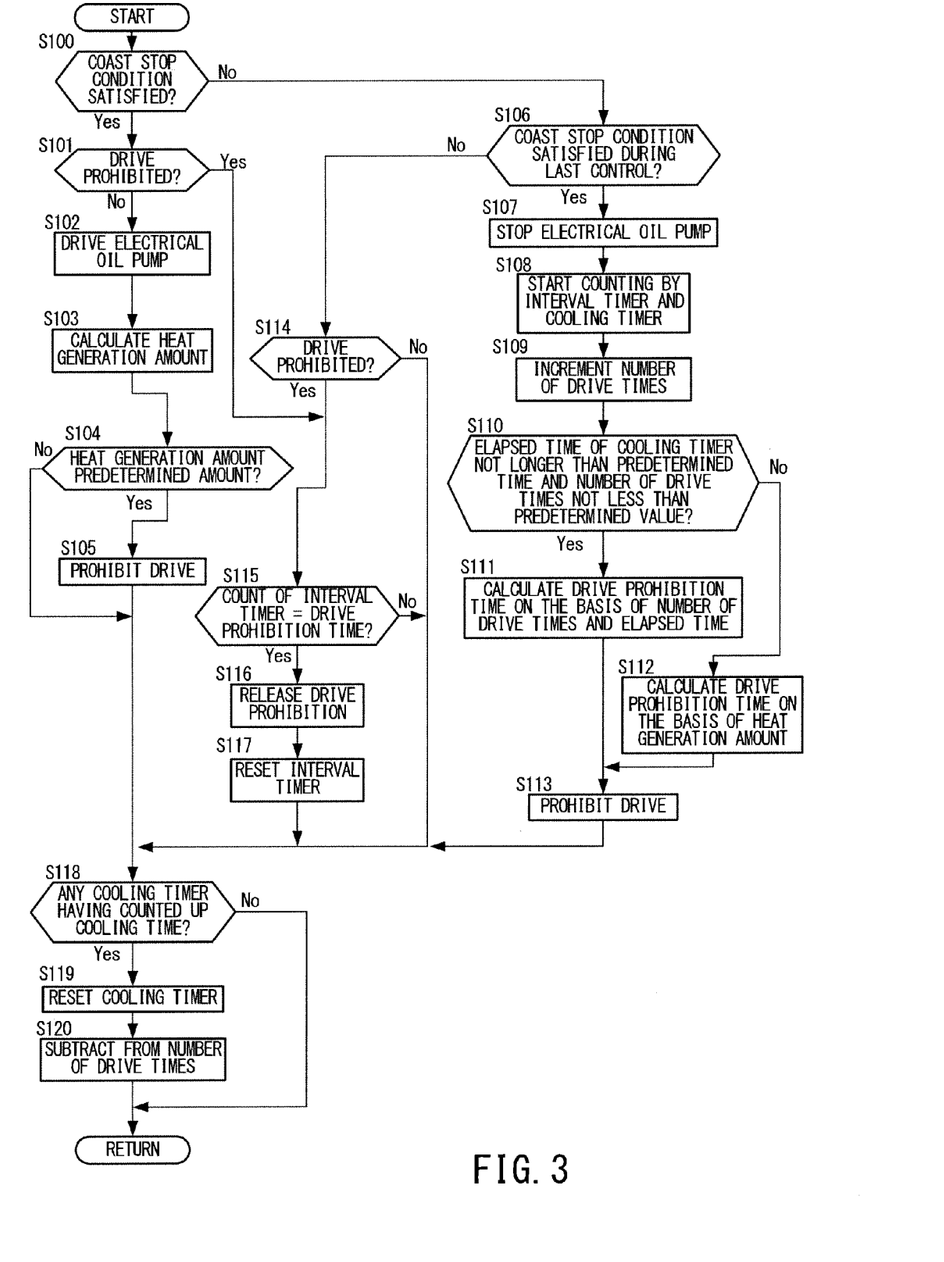
FIG. 3 is a flow chart showing a coast stop control of the embodiment.

Next, the coast stop control of the present embodiment is described using a flow chart of FIG. 3. Although a case where the coast stop control is executed to drive the electrical oil pump 10e is described here, a similar control is executed also in the case of driving the electrical oil pump 10e by executing the idle stop control or in the case of driving the electrical oil pump 10e by successively executing the coast stop control and the idle stop control.

In Step S100, the controller 12 determines whether or not the aforementioned coast stop condition has been satisfied. A process proceeds to Step S101 if the coast stop condition has been satisfied while proceeding to Step S106 if the coast stop condition has not been satisfied.

In Step S101, the controller 12 determines whether or not the drive of the electrical oil pump 10e is prohibited. Specifically, the controller 12 determines whether or not an electrical oil pump drive prohibition flag to be described in detail later is 1. The process proceeds to Step S115 if the electrical oil pump drive prohibition flag is 1 and the drive of the electrical oil pump 10e is prohibited while proceeding to Step S102 if the electrical oil pump drive prohibition flag is 0 and the drive of the electrical oil pump 10e is not prohibited.

In Step S102, the controller 12 automatically stops the engine 1, drives the electrical oil pump 10e and executes the coast stop control.

In Step S103, the controller 12 calculates the heat generation amount of the electrical oil pump 10e by the drive of the electrical oil pump 10e this time. Specifically, the controller 12 measures the driving time of the electrical oil pump 10e this time and calculates the heat generation amount on the basis of the driving time. The longer the driving time of the electrical oil pump 10e is, the larger the heat generation amount becomes.

In Step S104, the controller 12 determines whether or not the heat generation amount is not smaller than a predetermined amount. The predetermined amount is a heat generation amount on the basis of which it can be determined to be necessary to prohibit the drive of the electrical oil pump 10e when the driving time of the electrical oil pump 10e becomes long, and is set in advance. The process proceeds to Step S105 if the heat generation amount is not smaller than the predetermined amount while proceeding to Step S118 if the heat generation amount is smaller than the predetermined amount.

In Step S105, the controller 12 prohibits the drive of the electrical oil pump 10e and sets the electrical oil pump drive prohibition flag to 1.

If the coast stop condition is determined to be not satisfied in Step S100, the controller 12 determines in Step S106 whether or not the coast stop condition was satisfied during the last control. Specifically, the process proceeds to Step S107 if the coast stop condition was not satisfied during the control this time although the coast stop condition was satisfied during the last control while proceeding to Step S114 if the coast stop condition was not satisfied during the last control.

In Step S107, the controller 12 restarts the engine 1, stops the electrical oil pump 10e, starts the engine 1 and ends the coast stop control.

In Step S108, the controller 12 starts counting by an interval timer and a cooling timer for the stop of the electrical oil pump 10e in the control this time. The controller 12 newly starts counting by the interval timer and the cooling timer for the stop of the electrical oil pump 10e this time. The interval timer is a timer for determining whether or not the drive prohibition time has elapsed after the stop of the electrical oil pump 10e. The cooling timer is a timer for determining whether or not heat generated when the electrical oil pump 10e was driven could be sufficiently radiated. The controller 12 can simultaneously operate a plurality of cooling timers. Thus, if the electrical oil pump 10e is repeatedly driven and stopped, the controller 12 counts by the plurality of cooling timers according to each stop of each electrical oil pump 10e.

In Step S109, the controller 12 increments the number of drive times of the electrical oil pump 10e. The controller 12 increments the number of drive times for each cooling timer if counting is performed by the plurality of cooling timers. For example, if the controller 12 performs counting by the cooling timer for one previous stop of the electrical oil pump 10e from the stop of the electrical oil pump 10e this time, the number of drive times in the cooling timer operated by the stop of the electrical oil pump 10e this time is set at 1 and the number of drive times by the cooling timer operated by one previous stop of the electrical oil pump 10e is set at 2.

Figure 4:
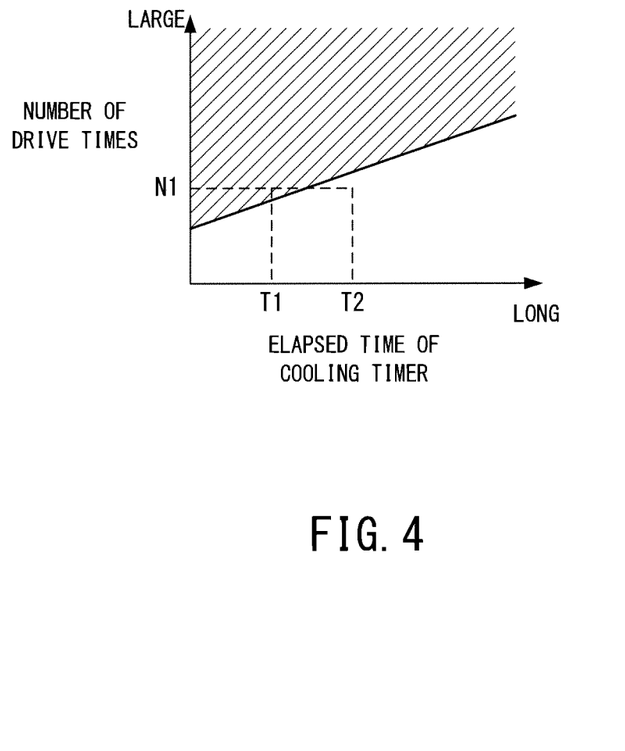
FIG. 4 is a map for determining a heat generating state of an electrical oil pump.

In Step S110, the controller 12 determines whether or not the elapsed time of the cooling timer is not longer than a predetermined time and the number of drive times in the cooling timer is not less than a predetermined number of times. The predetermined number of times and the predetermined time are set in advance. The controller 12 determines an integration value of heat generated when the electrical oil pump 10e is switched from the OFF-state to the ON-state to be large if the elapsed time of the cooling timer is not longer than the predetermined time and the number of drive times in the cooling timer is not less than the predetermined number of times. The process proceeds to Step S111 if the elapsed time of the cooling timer is not longer than the predetermined time and the number of drive times in the cooling timer is not less than the predetermined number of times while proceeding to Step S112 unless otherwise. It should be noted that this determination is made for each cooling timer if the plurality of cooling timers are operating and the process proceeds to Step S111 if the elapsed time becomes not longer than the predetermined time and the number of drive times becomes not less than the predetermined number of times even in one of the plurality of cooling timers. The controller 12 makes this determination on the basis of the elapsed time of the cooling timer and the number of drive times, for example, from a map shown in FIG. 4. FIG. 4 is the map for determining whether or not the integration value of the heat generation amount of the electrical oil pump 10e is large. When the electrical oil pump 10e is switched from the OFF-state to the ON-state, a current flowing in the motor driver increases and the heat generation amount of the electrical oil pump 10e increases. Thus, if the number of drive times of the electrical oil pump 10e increases in a short time, the integration value of the heat generation amount of the electrical oil pump 10e increases. In FIG. 4, an area where the integration value of the amount of heat generated when the electrical oil pump 10e is switched from the OFF-state to the ON-state is determined to be large is shown by hatching. For example, if the elapsed time of the cooling timer when the number of drive times reaches N1 is a predetermined time T1 in FIG. 4, the controller 12 determines that the integration value of the amount of heat generated when the electrical oil pump 10e is switched from the OFF-state to the ON-state is large. On the other hand, if the elapsed time of the cooling timer when the number of drive times reaches N1 is a predetermined time T2 (T2>T1) in FIG. 4, the controller 12 determines that the integration value of the amount of heat generated when the electrical oil pump 10e is switched from the OFF-state to the ON-state is small.

Figure 5:
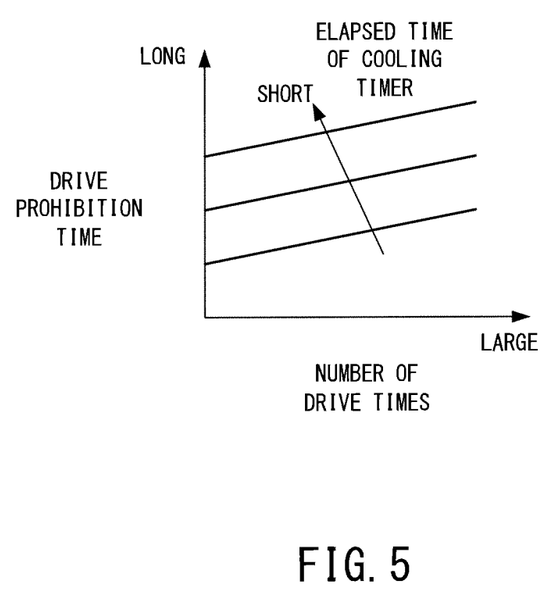
FIG. 5 is a map showing a relationship of the number of drive times, an elapse time of a cooling timer and a drive prohibition time.

In Step S111, the controller 12 calculates the drive prohibition time from a map of FIG. 5 on the basis of the number of drive times and the elapsed time of the cooling timer. FIG. 5 is the map showing a relationship of the number of drive times, the elapsed time of the cooling timer and the drive prohibition time. The larger the number of drive times or the shorter the elapsed time of the cooling timer is, the longer the drive prohibition time becomes. It should be noted that the number of drive times used here is the one that has reached the predetermined number of times within the predetermined time.

In Step S112, the controller 12 calculates the drive prohibition time on the basis of the heat generation amount of the electrical oil pump 10e calculated in Step S103. The larger the heat generation amount of the electrical oil pump 10e is, the longer the drive prohibition time becomes.

In Step S113, the controller 12 prohibits the drive of the electrical oil pump 10e and sets the electrical oil pump drive prohibition flag to 1.

If it is determined in Step S106 that the coast stop condition was not satisfied during the last control, the controller 12 determines in Step S114 whether or not the drive of the electrical oil pump 10e is prohibited. Specifically, the controller 12 determines whether or not the electrical oil pump drive prohibition flag is 1. The process proceeds to Step S115 if the drive of the electrical oil pump 10e is prohibited while proceeding to Step S118 if the drive of the electrical oil pump 10e is not prohibited.

In Step S115, the controller 12 determines whether or not the interval counter has counted up the drive prohibition time. The process proceeds to Step S116 if the interval counter has counted up the drive prohibition time while proceeding to Step S118 if the interval counter has not counted up the drive prohibition time yet.

In Step S116, the controller 12 releases the drive prohibition of the electrical oil pump 10e and sets the electrical oil pump drive prohibition flag to zero.

In Step S117, the controller 12 resets the interval timer.

In Step S118, the controller 12 determines whether or not there is any cooling timer that has counted up the cooling time of the electrical oil pump 10e. If the plurality of cooling timers are operating, the controller 12 determines for each cooling timer whether or not the cooling time has been reached. The process proceeds to Step S119 if there is any cooling timer that has counted up the cooling time while ending this control if there is no cooling timer that has counted up the cooling time. The cooling time is a time set in advance and capable of determining that a sufficient time has elapsed after the stop of the electrical oil pump 10e and heat generated by the drive of the electrical oil pump 10e has been sufficiently radiated.

In Step S119, the cooling timer that has counted up the cooling time is reset. Even if the electrical oil pump 10e is repeatedly driven and stopped, heat of the electrical oil pump 10e is radiated with the passage of time. Here, if the cooling timer for one previous stop of the electrical oil pump 10e from the stop of the electrical oil pump 10e this time has counted up the cooling time, the cooling timer for one previous stop of the electrical oil pump 10e is reset.

In Step S120, 1 is subtracted from the number of drive times according to the cooling timer that has counted up the cooling time. These cause the drive prohibition time of the electrical oil pump 10e to be calculated for the drive and stop of the electrical oil pump 10e from the next time on without being affected by heat generation caused by the drive of the electrical oil pump 10e for which the cooling time has elapsed. It should be noted that the number of drive times to be subtracted is not limited to 1 and may be set at a value not smaller than 2.

Next, the coast stop control is described using a time chart.

Figure 6:
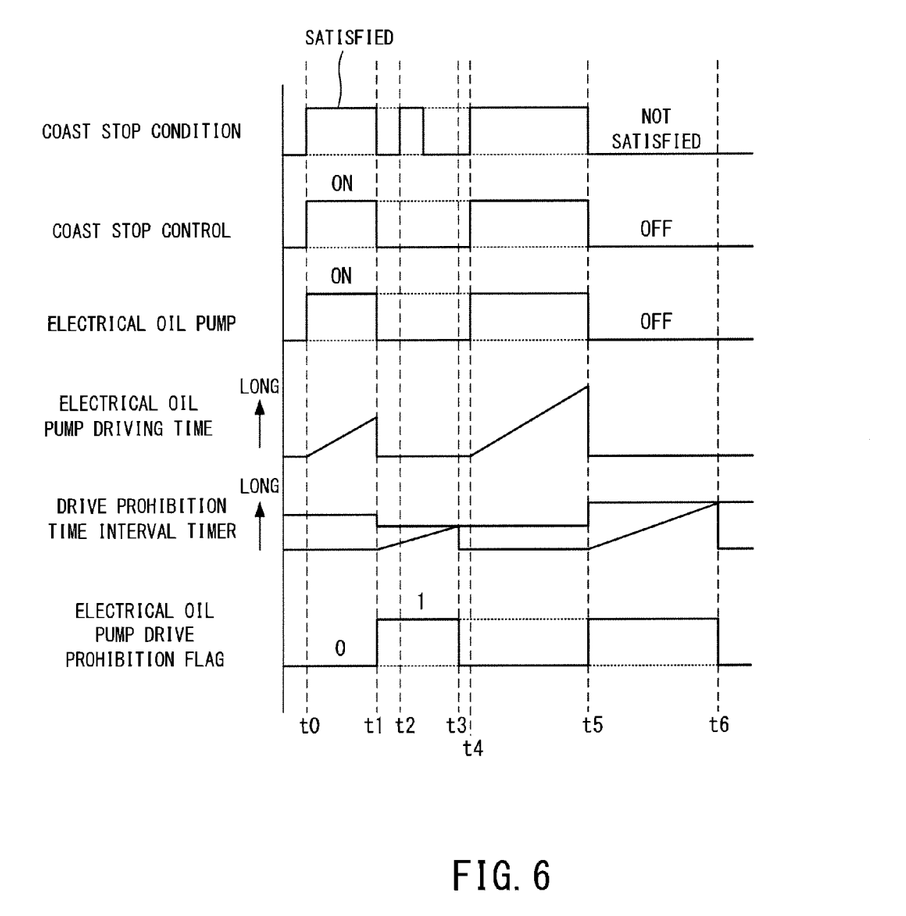
FIG. 6 is a time chart in the case of calculating the drive prohibition time of the electrical oil pump on the basis of a heat generation amount of the electrical oil pump.

First, a case where the drive prohibition time of the electrical oil pump 10e is calculated on the basis of the heat generation amount of the electrical oil pump 10e is described using a time chart of FIG. 6.

At time t0, the coast stop condition is satisfied and the coast stop control is executed. When the coast stop control is executed, the electrical oil pump 10e is driven and the driving time (heat generation amount) of the electrical oil pump 10e is measured.

When the coast stop condition is no longer satisfied at time t1, the coast stop control is ended and the electrical oil pump 10e is stopped. Further, counting by the interval timer is started, the drive prohibition time of the electrical oil pump 10e is calculated on the basis of the driving time of the electrical oil pump 10e and the drive of the electrical oil pump 10e is prohibited.

Since the drive of the electrical oil pump 10e is prohibited until the interval timer counts up the drive prohibition time, the coast stop control is not executed even if the coast stop condition is satisfied at time t2 during the drive prohibition time.

When the interval timer counts up the drive prohibition time at time t3, the drive of the electrical oil pump 10e is permitted.

When the coast stop condition is satisfied again at time t4, the coast stop control is executed.

When the coast stop condition is no longer satisfied at time t5, the coast stop control is ended and the electrical oil pump 10e is stopped. The coast stop control this time is executed for a longer time than during the last coast stop control and the heat generation amount of the electrical oil pump 10e is larger than last time. Thus, the drive prohibition time is longer than the last drive prohibition time.

When the interval timer counts up the drive prohibition time at time t6, the drive of the electrical oil pump 10e is permitted.

Figure 7:
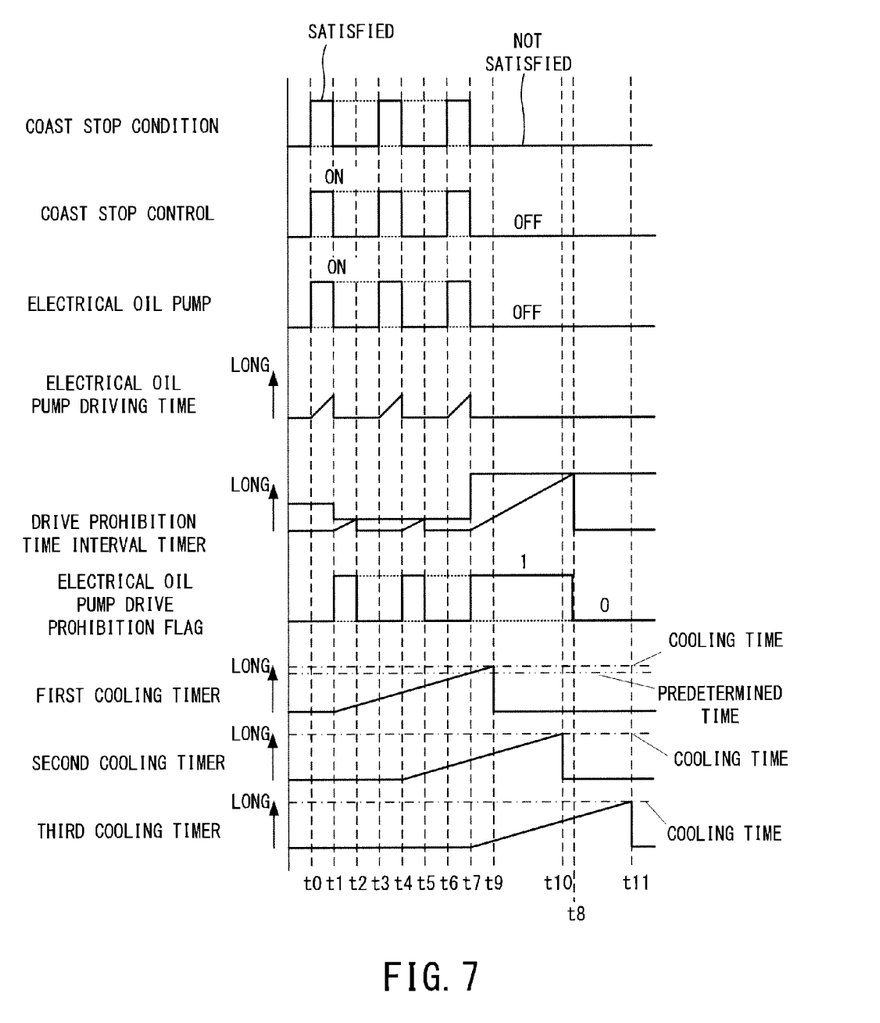
FIG. 7 is a time chart in the case of calculating the drive prohibition time of the electrical oil pump on the basis of the number of drive times of the electrical oil pump.

Next, a case where the drive prohibition time of the electrical oil pump 10e is calculated on the basis of the number of drive times of the electrical oil pump 10e is described using a time chart of FIG. 7.

At time t0, the coast stop condition is satisfied and the coast stop control is executed. When the coast stop control is executed, the electrical oil pump 10e is driven and the driving time of the electrical oil pump 10e is measured.

When the coast stop condition is no longer satisfied at time t1, the coast stop control is ended and the electrical oil pump 10e is stopped. Further, counting by the interval timer and the cooling timer is started, the drive prohibition time of the electrical oil pump 10e is calculated on the basis of the driving time of the electrical oil pump 10e and the drive of the electrical oil pump 10e is prohibited. It should be noted that the cooling timer operating at time t1 is referred to as a first cooling timer below for convenience of description.

When the interval timer counts up the drive prohibition time at time t2, the drive of the electrical oil pump 10e is permitted.

At time t3, the coast stop condition is satisfied and the coast stop control is executed. When the coast stop control is executed, the electrical oil pump 10e is driven and the driving time of the electrical oil pump 10e is measured.

When the coast stop condition is no longer satisfied at time t4, the coast stop control is ended and the electrical oil pump 10e is stopped. Further, counting by the interval timer and the cooling timer is started, the drive prohibition time of the electrical oil pump 10e is calculated on the basis of the driving time of the electrical oil pump 10e and the drive of the electrical oil pump 10e is prohibited. It should be noted that the cooling timer operating at time t4 is referred to as a second cooling timer below for convenience of description. Here, the first and second cooling timers are operating, the number of drive times in the first cooling timer is 2 and that in the second cooling timer is 1.

When the interval timer counts up the drive prohibition time at time t5, the drive of the electrical oil pump 10e is permitted.

At time t6, the coast stop condition is satisfied and the coast stop control is executed. When the coast stop control is executed, the electrical oil pump 10e is driven and the driving time of the electrical oil pump 10e is measured.

When the coast stop condition is no longer satisfied at time t7, the coast stop control is ended and the electrical oil pump 10e is stopped. Further, counting by the interval timer and the cooling timer is started. The cooling timer operating at time t7 is referred to as a third cooling timer below for convenience of description. Here, the first, second and third cooling timers are operating, the number of drive times in the first cooling timer is 3, that in the second cooling timer is 2 and that in the third cooling timer is 1. Here, the electrical oil pump 10e is repeatedly driven and stopped in a short time and the number of drive times for the first cooling timer becomes a predetermined number of times (three times) within the predetermined time. Thus, the drive prohibition time of the electrical oil pump 10e is calculated on the basis of the predetermined time and the predetermined number of times and the drive of the electrical oil pump 10e is prohibited.

When the interval timer counts up the drive prohibition time at time t8, the drive of the electrical oil pump 10e is permitted.

When the first cooling timer counts up the cooling time at time t9, the second cooling timer counts up the cooling time at time t10 and the third cooling timer counts up the cooling time at time t11, each cooling timer is re set.

Effects of the embodiment of the present invention are described.

The drive prohibition time necessary to cool the electrical oil pump 10e is calculated on the basis of the heat generation amount of the electrical oil pump 10e. This can prevent the drive of the electrical oil pump 10e from being prohibited after the elapse of the necessary drive prohibition time and prevent the drive prohibition time from being set unnecessarily long although a time necessary to cool the electrical oil pump 10e is short when the drive time of the electrical oil pump 10e is short and the heat generation amount of the electrical oil pump 10e is small. Thus, in a scene where the condition of the coast stop control or the idle stop control is temporarily no longer satisfied and, immediately thereafter, satisfied after the coast stop control or the idle stop control is executed for a short time, the coast stop control or the idle stop control can be executed and the fuel economy of the engine 1 can be improved.

Further, when the heat generation amount of the electrical oil pump 10e is large, the drive of the electrical oil pump 10e is prohibited until the electrical oil pump 10e is sufficiently cooled. This can prevent the overheating of the electrical oil pump 10e, suppress the degradation of the constituent components of the electrical oil pump 10e and suppress deterioration in the discharge performance and durability of the electrical oil pump 10e.

By calculating the heat generation amount on the basis of the driving time of the electrical oil pump 10e, the heat generation amount of the electrical oil pump 10e can be calculated without using sensors such as a temperature sensor.

The longer the driving time of the electrical oil pump 10e is, the larger the heat generation amount becomes. In the present embodiment, the longer the driving time of the electrical oil pump 10e is, the longer the set drive prohibition time of the electrical oil pump 10e becomes. This can prevent the overheating of the electrical oil pump 10e and suppress deterioration in the discharge performance and durability of the electrical oil pump 10e. Further, when the driving time of the electrical oil pump 10e is short and the time necessary to cool the electrical oil pump 10e is short, the drive prohibition time is shortened. This enables the coast stop control or the idle stop control to be appropriately executed according to the state of the electrical oil pump 10e and can improve the fuel economy of the engine 1.

When the electrical oil pump 10e is switched from the OFF-state to the ON-state, more current flows, and more heat is generated than when the electrical oil pump 10e is continuously used. In the present embodiment, the drive prohibition time is extended with an increase in the number of drive times when the elapsed time of the cooling timer is not longer than the predetermined time and the number of drive times of the electrical oil pump 10e is not less than the predetermined number of times. This can prevent the overheating of the electrical oil pump 10e and suppress deterioration in the discharge performance and durability of the electrical oil pump 10e by extending the drive prohibition time with an increase in the number of drive times when the electrical oil pump 10e is repeatedly driven and stopped in a short time.

Further, in the present embodiment, the drive prohibition time is extended with a decrease in the elapsed time of the cooling timer when the number of drive times of the electrical oil pump 10e becomes the predetermined number of times or more. This can prevent the overheating of the electrical oil pump 10e and suppress deterioration in the discharge performance and durability of the electrical oil pump 10e.

When the elapsed time of the cooling timer reaches the cooling time, the cooling timer having counted up the cooling time is reset and the number of drive times is subtracted. In this way, the drive prohibition time can be calculated according to the current amount of heat of the electrical oil pump 10e.

Although the embodiment of the present invention has been described above, the above embodiment is merely one application example of the present invention and not of the nature to limit the technical scope of the prevent invention to the specific configuration of the above embodiment.

Although the heat generation amount of the electrical oil pump 10e is calculated on the basis of the driving time of the electrical oil pump 10e in the above embodiment, it may be calculated on the basis of an automatic stop time of the engine 1 during the idle stop control or the coast stop control. The heat generation amount of the electrical oil pump 10e can be calculated also by this without using sensors such as a temperature sensor. In this case, the longer the automatic stop time of the engine 1 is, the longer the drive prohibition time of the electrical oil pump 10e becomes. This can prevent the overheating of the electrical oil pump 10e and suppress deterioration in the discharge performance and durability of the electrical oil pump 10e. Further, the drive prohibition time is shortened if the time for cooling the electrical oil pump 10e is short. This enables the coast stop control or the idle stop control to be appropriately executed according to the state of the electrical oil pump 10e and can improve the fuel economy of the engine 1.

Further, the temperature of the electrical oil pump 10e may be detected by a temperature sensor and the drive prohibition time may be calculated on the basis of the detected temperature. The heat generation amount of the electrical oil pump 10e is small if a load of the electrical oil pump 10e is small even when the driving time of the electrical oil pump 10e is long. Furthermore, the heat generation amount of the electrical oil pump 10e is large if a load of the electrical oil pump 10e is large even when the driving time of the electrical oil pump 10e is short. Thus, it is possible to accurately calculate the heat generation amount of the electrical oil pump 10e and accurately prohibit the drive of the electrical oil pump 10e on the basis of the temperature detected by the temperature sensor.

Further, a load of the electrical oil pump 10e may be detected and the heat generation amount of the electrical oil pump 10e may be calculated according to the load. This enables the heat generation amount of the electrical oil pump 10e to be accurately calculated without using the temperature sensor and the drive of the electrical oil pump 10e to be accurately prohibited.

The load of the electrical oil pump 10e may be calculated on the basis of an integration value of the current flowing in the electrical oil pump 10e. This enables heat generated in the electrical oil pump 10e to be estimated.

Further, the load of the electrical oil pump 10e may be calculated on the basis of an integration value of the rotation speed of the electrical oil pump 10e. This enables heat generated in the electrical oil pump 10e to be estimated even when it is not possible to detect the current flowing in the electrical oil pump 10e.

The present application claims for priority based on Japanese Patent Application No. 2013-49405 filed with Japan Patent Office on Mar. 12, 2013, and the entire contents of this application are incorporated in this Description by reference.

The invention claimed is:

1. A vehicle control device for controlling a vehicle with a drive source automatic stop unit configured to automatically stop a drive source when a predetermined automatic stop condition is satisfied and an electrical oil pump to be driven during an automatic stop of the drive source; comprising:
a drive prohibition time calculation unit configured to calculate a drive prohibition time of the electrical oil pump on the basis of a heat generation amount of the electrical oil pump;
a drive prohibition unit configured to prohibit the drive of the electrical oil pump until the drive prohibition time elapses from the end of the drive of the electrical oil pump;
a time measurement unit configured to measure a time after the drive of the electrical oil pump; and
a drive number measurement unit configured to measure the number of drive times of the electrical oil pump from the start of the measurement of the time by the time measurement unit,
wherein the drive prohibition time calculation unit is configured to extend the drive prohibition time with a decrease in the time when the time measured by the time measurement unit is not longer than a predetermined time and the number of drive times of the electrical oil pump measured by the drive number measurement unit is not less than a predetermined number of times.

2. The vehicle control device according to claim 1, wherein:
the heat generation amount is calculated on the basis of a driving time of the electrical oil pump.

3. The vehicle control device according to claim 2, wherein:
the drive prohibition time calculation unit is configured to extend the drive prohibition time of the electrical oil pump with an increase in the driving time of the electrical oil pump.

4. The vehicle control device according to claim 1, wherein:
the heat generation amount is calculated on the basis of an automatic stop time of the drive source.

5. The vehicle control device according to claim 4, wherein:
the drive prohibition time calculation unit is configured to extend the drive prohibition time of the electrical oil pump with an increase in the automatic stop time of the drive source.

6. The vehicle control device according to claim 1, wherein:
the heat generation amount is calculated on the basis of a temperature of the electrical oil pump.

7. The vehicle control device according to claim 1, wherein:
the heat generation amount is calculated on the basis of a load of the electrical oil pump.

8. The vehicle control device according to claim 7, wherein:
the load is calculated on the basis of an integration value of a current flowing in the electrical oil pump.

9. The vehicle control device according to claim 7, wherein:
the load is calculated on the basis of an integration value of the number of revolutions of the electrical oil pump.

10. The vehicle control device according to claim 1, wherein:
the drive prohibition time calculation unit is configured to extend the drive prohibition time with an increase in the number of drive times of the electrical oil pump within the predetermined time when the time measured by the time measurement unit is not longer than the predetermined time and the number of drive times of the electrical oil pump measured by the drive number measurement unit is not less than the predetermined number of times.

11. The vehicle control device according to claim 1, comprising:
the time measurement unit is configured to be capable of measuring a plurality of the times according to the drive of the electrical oil pump;

the drive number measurement unit is configured to be capable of measuring the number of drive times in the measurement of each of the plurality of times; and the time measurement unit is configured to reset a measurement value having reached a cooling time and the drive number measurement unit subtracts from each number of drive times when the stop time of the electrical oil pump reaches the cooling time.

12. A vehicle control method for automatically stopping a drive source when a predetermined automatic stop condition is satisfied and driving an electrical oil pump during an automatic stop of the drive source, comprising:

calculating a drive prohibition time of the electrical oil pump on the basis of a heat generation amount of the electrical oil pump;

measuring a time after the drive of the electrical oil pump;

measuring the number of drive times of the electrical oil pump from the start of the measurement of the time after the drive of the electrical oil pump; and prohibiting the drive of the electrical oil pump until the drive prohibition time elapses from the end of the drive of the electrical oil pump, wherein the drive prohibition time is extended with a decrease in the time when the measured time is not longer than a predetermined time and the measured number of drive times of the electrical oil pump is not less than a predetermined number of times.

13. A vehicle control device for controlling a vehicle with drive source automatic stop means for automatically stopping a drive source when a predetermined automatic stop condition is satisfied and an electrical oil pump to be driven during an automatic stop of the drive source; comprising:

drive prohibition time calculation means for calculating a drive prohibition time of the electrical oil pump on the basis of a heat generation amount of the electrical oil pump;

drive prohibition means for prohibiting the drive of the electrical oil pump until the drive prohibition time elapses from the end of the drive of the electrical oil pump;

time measurement means for measuring a time after the drive of the electrical oil pump; and drive number measurement means for measuring the number of drive times of the electrical oil pump from the start of the measurement of the time by the time measurement means, wherein the drive prohibition time calculation means extends the drive prohibition time with a decrease in the time when the time measured by the time measurement means is not longer than a predetermined time and the number of drive times of the electrical oil pump measured by the drive number measurement means is not less than a predetermined number of times.

* * * * *